(12) United States Patent
Freeman et al.

(10) Patent No.: US 11,343,967 B1
(45) Date of Patent: May 31, 2022

(54) ROBOTIC AUTOMATION OF MECHANICAL FIELD HARVESTING OF BROCCOLI PLANTS

(71) Applicant: CV Robotics Booster Club, Corvallis, OR (US)

(72) Inventors: Duncan Freeman, Corvallis, OR (US); Lane Alvis, Albany, OR (US); Abraham Mes, Corvallis, OR (US); Micah Mes, Corvallis, OR (US); Benjamin Nelson, Corvallis, OR (US); Carter Precourt, Corvallis, OR (US); Genevieve Sauret, Corvallis, OR (US); Danielle Scutero, Corvallis, OR (US)

(73) Assignee: CV ROBOTICS BOOSTER CLUB, Corvallis, OR (US)

( * ) Notice: Subject to any disclaimer, the term of this patent is extended or adjusted under 35 U.S.C. 154(b) by 461 days.

(21) Appl. No.: 16/684,008

(22) Filed: Nov. 14, 2019

Related U.S. Application Data (60) Provisional application No. 62/767,066, filed on Nov. 14, 2018.

(51) Int. Cl.
| | |
|---|---|
| *A01D 46/30* | (2006.01) |
| *A01B 63/00* | (2006.01) |
| *A01B 69/04* | (2006.01) |
| *A01D 45/00* | (2018.01) |
| *B25J 9/16* | (2006.01) |
| *B25J 19/02* | (2006.01) |
| *G05D 1/02* | (2020.01) |

(Continued)

(52) U.S. Cl.
CPC ............ *A01D 46/30* (2013.01); *A01B 63/008* (2013.01); *A01B 69/008* (2013.01); *A01D 45/00* (2013.01); *B25J 5/007* (2013.01); *B25J 9/1679* (2013.01); *B25J 9/1697* (2013.01); *B25J 11/0045* (2013.01); *B25J 15/0019* (2013.01); *B25J 19/021* (2013.01); *G05D 1/021* (2013.01); *G01C 9/06* (2013.01); *G05D 2201/0201* (2013.01)

(58) Field of Classification Search
CPC .............................. A01D 46/30; A01B 63/008
See application file for complete search history.

(56) References Cited

U.S. PATENT DOCUMENTS

| | | | |
|---|---|---|---|
| 3,690,049 | A | 9/1972 | Roberson |
| 4,136,509 | A | 1/1979 | Lenker et al. |

(Continued)

FOREIGN PATENT DOCUMENTS

| | | |
|---|---|---|
| GB | 2553618 A | 3/2018 |
| JP | 6218905 B1 | 10/2017 |

(Continued)

*Primary Examiner* — Thomas Randazzo
(74) *Attorney, Agent, or Firm* — Stoel Rives LLP (57) ABSTRACT

A robotic automated broccoli plant harvesting apparatus uses a vision system implemented with an RGB depth camera that provides imaging signals. Software operating on a microcomputer processes the imaging signals to identify the height and position of a broccoli plant to sever it with dual opposed cutting blades. In a preferred embodiment, the software algorithm combines color, texture, and distance information of the broccoli plant to reliably cut the broccoli stalk with ⅛-inch (3.175-millimeter) accuracy. Broccoli stalks of consistent lengths result in uniform, commercially viable products.

12 Claims, 5 Drawing Sheets

(51) Int. Cl.
*B25J 11/00* (2006.01)
*B25J 5/00* (2006.01)
*B25J 15/00* (2006.01)
*G01C 9/06* (2006.01)

(56) References Cited

U.S. PATENT DOCUMENTS

| | | | | |
|---|---|---|---|---|
| 4,425,751 A | * | 1/1984 | Bousseau | G05D 1/0255 |
| | | | | 56/327.2 |
| 4,482,960 A | * | 11/1984 | Pryor | A01D 46/30 |
| | | | | 701/28 |
| 4,773,324 A | | 9/1988 | Wylie et al. | |
| 5,058,369 A | * | 10/1991 | Garner | A01D 23/04 |
| | | | | 56/157 |
| 5,154,281 A | * | 10/1992 | Garner | A01D 45/00 |
| | | | | 198/846 |
| 7,854,108 B2 | | 12/2010 | Koselka et al. | |
| 8,306,663 B2 | | 11/2012 | Wickham | |
| 2006/0150602 A1 | | 7/2006 | Stimmann | |
| 2010/0292841 A1 | * | 11/2010 | Wickham | B25J 15/0206 |
| | | | | 700/259 |
| 2011/0293797 A1 | | 12/2011 | Pryor et al. | |
| 2017/0131718 A1 | * | 5/2017 | Matsumura | A01B 69/008 |
| 2019/0029178 A1 | * | 1/2019 | Russel | A01D 46/30 |
| 2019/0297778 A1 | * | 10/2019 | George | A01D 45/26 |
| 2021/0337734 A1 | * | 11/2021 | Jeanty | B65G 47/914 |
| 2022/0078972 A1 | * | 3/2022 | Faulring | B25J 15/06 |

FOREIGN PATENT DOCUMENTS

| | | | |
|---|---|---|---|
| NL | 1042254 A | 8/2017 | |
| WO | 2015121809 A1 | 8/2015 | |

* cited by examiner

ROBOTIC AUTOMATION OF MECHANICAL FIELD HARVESTING OF BROCCOLI PLANTS

COPYRIGHT NOTICE

© 2019 CV Robotics Booster Club. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to harvesting cruciferous vegetables and, in particular, to robotic automation of mechanical field harvesting of broccoli plants.

BACKGROUND INFORMATION

Broccoli is a green plant having a large flowering crown composed of multiple florets that people eat as a vegetable. Broccoli is a very labor-intensive crop and one of the few vegetable crops harvested by hand. One method of manually harvesting broccoli plants entails forming a line of field laborers along a 53 foot (16.2 m) long conveyor belt system and causing it to slowly traverse a swath of a large area planting of broccoli. The field laborers, while walking behind the slow-moving conveyor belt system, use dull knives to cut heads or crowns of broccoli from their stalks and then load the broccoli crowns onto the conveyor belt system. A typical crew of field laborers practicing this manual harvesting method typically cuts 3-5 acres of broccoli plants each day and takes about 7-8 days to clear a 20-acre planting of broccoli.

Problems associated with manual harvesting of broccoli plants result from the presence of a leaf canopy covering the broccoli crown, the high cost of manual labor, and the inaccessibility of reliable mechanical harvesters. Broccoli crowns often grow at least partly beneath the canopy of leaves hiding the crowns from view. Such obscuration of the broccoli crown makes it difficult to develop harvesters that can accurately identify a broccoli crown and autonomously cut it from the broccoli stalk. Manual labor costs are exceedingly high because of this gap in the agricultural technology industry. Specifically, the cost of labor can be up to $850 for each acre.

Other problems associated with manual labor include finding a sufficient number of workers to harvest all of the crops and the considerable amount of time needed to carry out the crop harvesting process. These technological and financial obstacles have relegated broccoli plant harvesting to a lower profitability position, as compared with more efficiently harvested produce. Currently available mechanical broccoli plant harvesters that could serve to improve the harvesting process and reduce manual labor costs produce inconsistent results and usually cost hundreds of thousands of dollars. Broccoli plants are grown mostly on small farms, and their owners simply cannot afford to make an investment in such expensive crop harvesting equipment. Altogether, harvesting of broccoli plants is a costly process that is in great need of more efficient, inexpensive automation.

SUMMARY OF THE DISCLOSURE

A preferred embodiment of the disclosed robotic automated broccoli plant harvesting apparatus uses a vision system implemented with an RGB depth camera that provides imaging signals. Software operating on a microcomputer processes the imaging signals to identify the height and position of the broccoli plant to sever it with dual opposed cutting blades. The software algorithm combines color, texture, and distance information of the broccoli plant to reliably cut the broccoli stalk with ⅛-inch (3.175-millimeter) accuracy. Broccoli stalks of consistent lengths result in uniform, commercially viable products.

Although it works best harvesting exerted head broccoli plants, the disclosed harvesting apparatus needs unobstructed access to only part of the broccoli crown. This capability enables automatic identification and harvesting of all varieties of broccoli plants, so long as they are not completely covered by leaves. Moreover, the disclosed harvesting apparatus can be paired with currently available devices that are capable of moving leaves out of the way, if needed, to overcome any remaining stalk cut-length accuracy problems. Exerted head broccoli plants can be made with the use of genetically modified organisms (GMOs) and optionally through traditional cross-breeding.

The vision system used in the disclosed harvesting apparatus enables complete autonomous movement, using electric motors and no manual steering, along a row of broccoli plants. The disclosed harvesting apparatus is commercially viable for quick and efficient crop harvesting because it accurately cuts broccoli plants while averaging about 1-3 miles per hour (0.447-1.34 meters per second), which is a fast pace for a crop harvester.

Because its production and material costs are under $20,000, as compared to the hundreds of thousands of dollars most crop harvesters cost, the disclosed harvesting apparatus addresses the accessibility problem that current crop harvesters face. As stated earlier, most broccoli planting and harvesting work is done on small farms. The enhanced capabilities of the disclosed harvesting apparatus make it very affordable to owners of small farms.

Lastly, the disclosed harvesting apparatus is designed for easy maintenance and is, therefore, of lower cost, thereby making it viable to a larger commercial audience.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
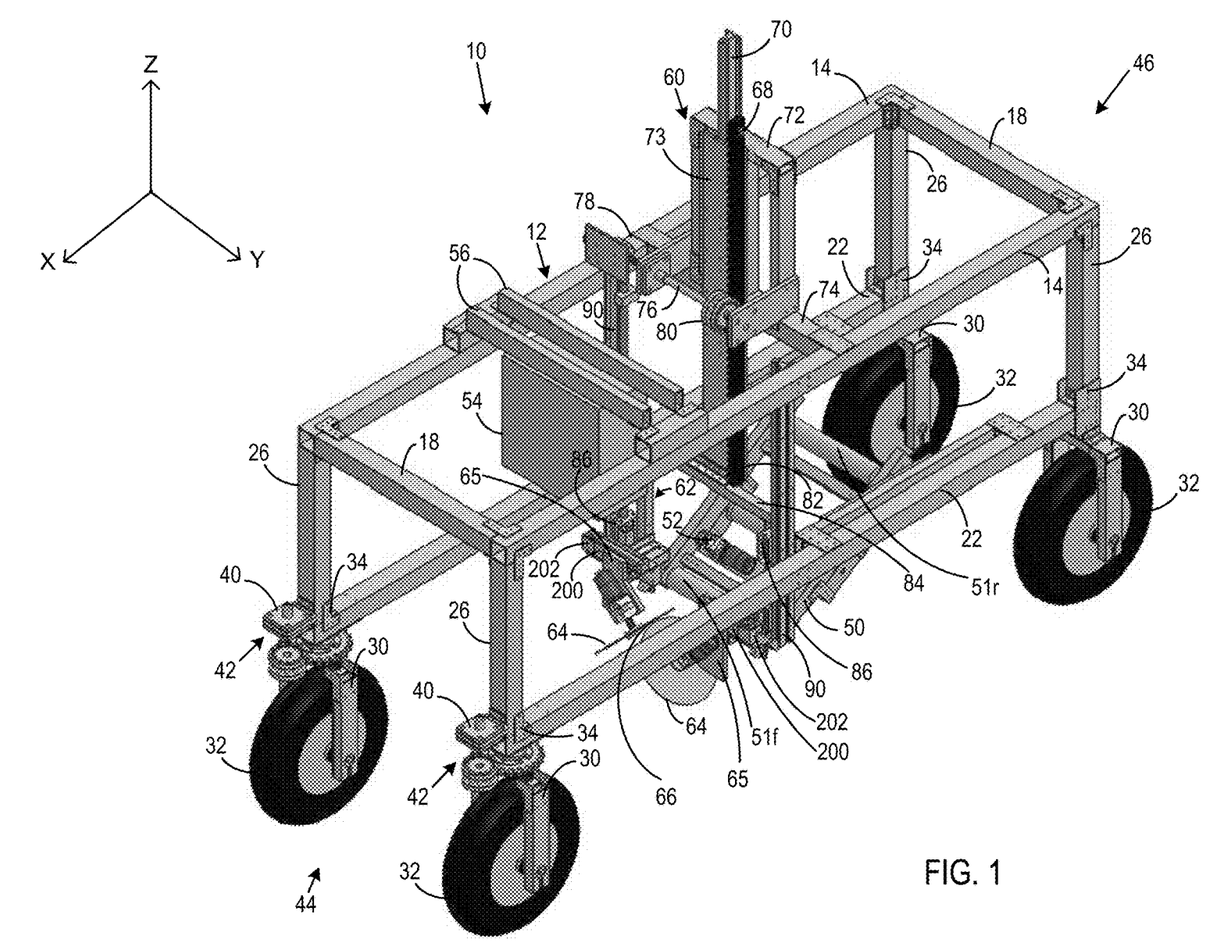
FIG. 1 is a pictorial diagram of an embodiment of a mobile broccoli plant field harvesting apparatus that is implemented with robotic automation control in accordance with the present disclosure.

FIG. 1 is a pictorial diagram of a mobile broccoli plant field harvesting apparatus 10 that is implemented with robotic automation control. The orientation and directions of motion of component parts, and the direction of travel, of harvesting apparatus 10 are defined with reference to the Cartesian coordinates shown on FIG. 1.

With reference to FIG. 1, harvesting apparatus 10 includes an inverted U-shaped, three-dimensional rectangular skeletal frame 12. Frame 12 is formed by two spaced-apart, parallel-aligned upper square metal tubes 14 joined at their ends by tubular metal frame crossbars 18, and spaced-apart, parallel-aligned lower square metal tubes 22 joined at their ends to the corresponding ends of upper tubes 14 by tubular metal uprights 26. A U-shaped bracket 30 fitted with an axle about which a solid rubber tire wheel 32 rotates is mounted at each of the four corners 34 formed by the junctions of the ends of lower tubes 22 and the corresponding lower ends of tubular uprights 26. Wheels 32 enable harvesting apparatus 10 to traverse and cut a swath of standing broccoli plants in response to either manually applied or motor-driven motive force. A steering DC motor 40, to which a rotary encoder is attached, and a gear assembly 42 between a corner 34 and a U-shaped bracket 30 for each of wheels 32 located at a front end 44 of frame 12 provide steering capability for harvesting apparatus 10. U-shaped brackets 30 for wheels 32 are rigidly mounted to corners 34 located at a rear end 46 of frame 12 so that wheels 32 at front end 44 guide the direction of travel of harvesting apparatus 10 along the X-axis during a broccoli plant cutting operation. A support frame 50 attached to and positioned between lower tubes 22 carries spaced-apart pulleys 51f and 51r about which an endless conveyor belt (not shown) rotates at a medial position between front end 44 and rear end 46 of frame 12. A DC motor 52 powers pulley 51f to move the conveyor belt and cut-broccoli plants resting on it to a collection hopper (not shown) set nearer to rear end 46.

An electronics cabinet 54, which downwardly depends from cabinet support crossbars 56 affixed to upper tubes 14 of frame 12, contains an RGB depth camera 58 (FIG. 2) and electronic circuitry 59 (FIG. 2) that controls the operation of harvesting apparatus 10. Camera 58 is oriented so that its field of view (FOV) covers the crown and stalk portions of the broccoli plants straddled between lower tubes 22. Upper tubes 14 support a rack and pinion mechanism 60 to which is mounted a cutting mechanism carriage frame 62. Carriage frame 62 holds a height-adjustable cutting system, which includes two electric motor-driven circular cutting blades or disks 64 affixed to cutting disk mounting plates 65 positioned downstream of camera 58, i.e., cutting disks 64 are located nearer to rear end 46, and mounted for controlled positioning along the Z-axis. Cutting disks 64 are angularly inclined relative to and spaced apart from each other to form an inverted V-shape with a gap 66 at the vertex. Gap 66 is of sufficient size to allow cutting of a broccoli stalk captured between cutting disks 64. Rack and pinion mechanism 60 includes a rack 68 supported for sliding motion along a linear slide 70 that is mounted to a rectangular bracket 72. A pillow block (not shown) slides along linear slide 70 and is connected to the back surface of a plate 73 to which rack 68 is mounted on the visible side. Bracket 72 is mounted to a tubular metal support crossbar 74 secured to upper tubes 14. A pinion shaft 76 driven by an electric height-adjusting DC motor 78, to which a rotary encoder (not shown) is attached, and terminating in a pinion gear 80 moves rack 68 up and down along the Z-axis. A lower end 82 of rack 68 is attached to an upper side 84 of carriage frame 62, and opposite sides 86 of carriage frame 62 are fitted for sliding movement in vertical linear guides 90 attached to and extending between upper tubes 14 and lower tubes 22.

The electronic circuitry, in response to a broccoli plant height measurement signal produced by processing of image information acquired by camera 58, delivers a cutting height signal to height-adjusting motor 78 of rack and pinion mechanism 60. Height-adjusting motor 78 moves carriage frame 62 along the Z-axis to a position where cutting disks 64 sever the broccoli stalk at a specified distance below the bottom of the broccoli crown. The electronic circuitry also delivers a steering angle signal to position the turning angle of the front wheels 32. Production of the steering angle signal is based on the vision system detecting broccoli crowns in the X, Y, and Z directions. Broccoli is typically planted in generally straight rows, or in an alternating offset pattern in which, within an approximately 28 in. (71.1 cm)-wide space, broccoli crowns arranged in a row are set alternately to the extreme left and to the extreme right. The software keeps track of the average values of the centers of the detected broccoli crowns, and in response, harvesting apparatus 10 steers front wheels 32 slightly toward the accumulated average centers of the detected broccoli crowns.

Figure 2:
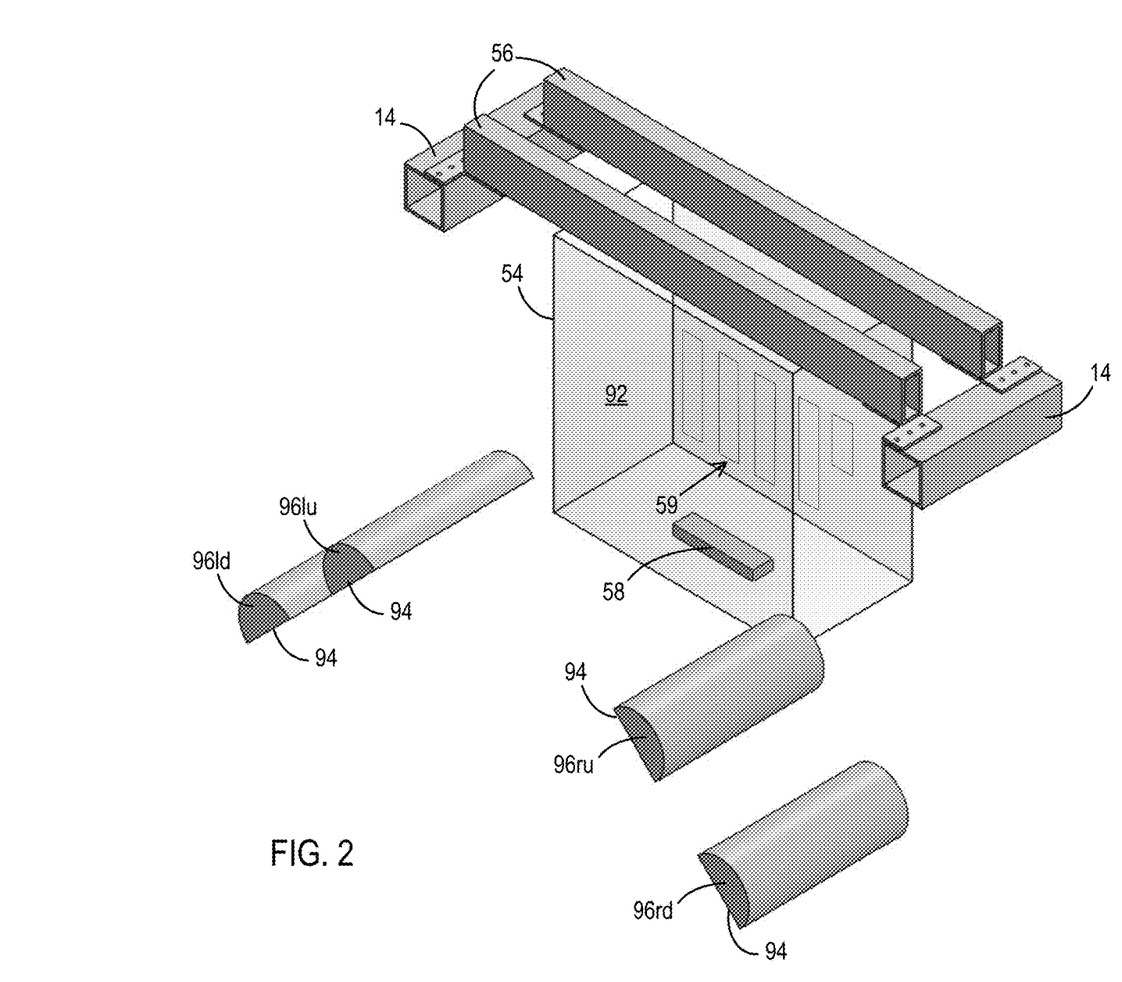
FIG. 2 is an enlarged fragmentary view of an electronics cabinet included in the harvesting apparatus of FIG. 1, the cabinet containing an RGB depth camera and having a surface supporting collections of light emitting diodes (LEDs) that uniformly illuminate a region observed by the camera.

FIG. 2 is an enlarged fragmentary view of a surface 92 of electronics cabinet 54 of harvesting apparatus 10. Surface 92 faces rear end 46 of frame 12. A lens of camera 58 acquires images of broccoli plants facing surface 92. Collections of light emitting diodes (LEDs) 94 are installed in housings 96lu, 96ld, 96ru and 96rd, which are arranged in staggered positions at different heights to provide a source of light that evenly illuminates, for example, a 28 in. (71.1 cm) wide (Y-direction), 10 in. (25.4 cm) long (X-direction), and 12 in. (30.5 cm) deep (Z-direction) region. (The support structures for housings 96lu, 96ld, 96ru, and 96rd are omitted from the drawings for purposes of clarity.) LEDs 96 are preferred because they are efficient and produce little infrared (IR) light, which would otherwise interfere with the depth projector installed in camera 58.

To eliminate the effect of ambient light, a black cloth skirt (not shown) is placed on the frontal and lateral sides of frame 12, starting from front end 44 and ending at about the location of cutting disks 64, to shade the interior area draped by the skirt. The cloth skirt placed in front of and around frame 12 blocks light. The skirt is slatted in the direction from upper tubes 14 to lower tubes 22 at the intake area of front end 44 and is multi-layered to form elongated panels the broccoli plants can spread apart and thereby pass through the skirt. The broccoli plants spread part the panels but generally block light in a manner akin to the spreading vertical panels by a vehicle as it is driven into the entrance of an automated car wash.

Figure 3:
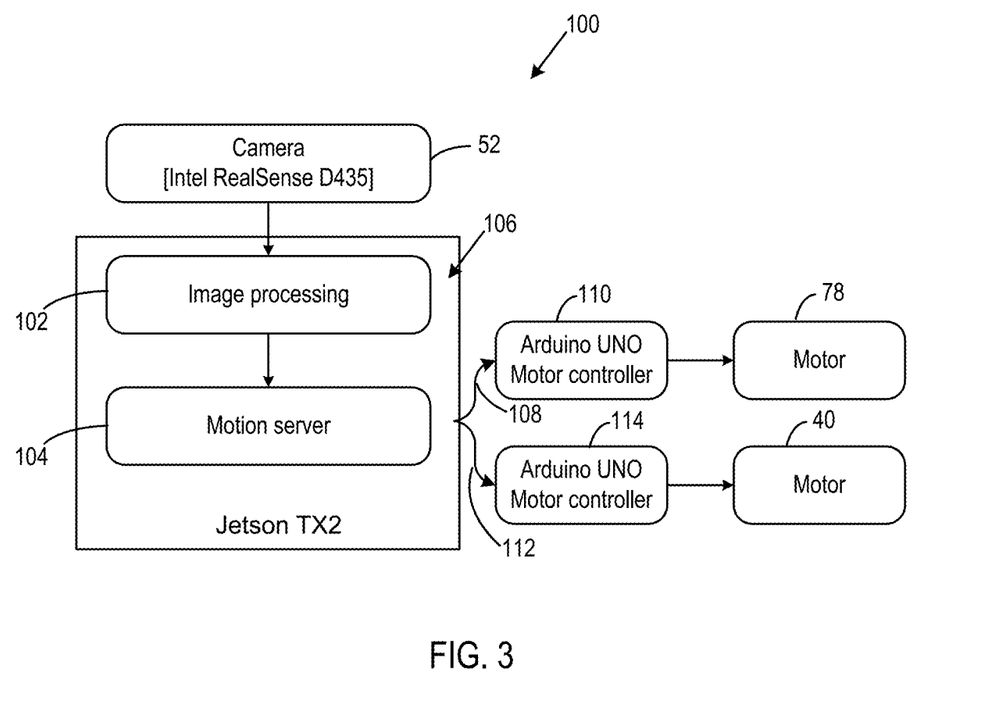
FIG. 3 is a simplified block diagram showing an overall image processing and motion control path enabling the operation of an embodiment of the harvesting apparatus embodiment of FIG. 1.

FIG. 3 is a simplified block diagram showing the overall image processing and motion control path 100 enabling the operation of an embodiment of harvesting apparatus 10. With reference to FIG. 3, camera 58 is preferably an Intel® RealSense™ Depth Camera D435, which is a USB-powered depth camera that is implemented with a stereo depth algorithm for accurate depth perception and long range and includes two depth sensors, an RGB sensor, and an active infrared projector. Camera 58 has a color image signal processor for image adjustments and scaling color data. The infrared projector illuminates objects, i.e., broccoli plants, to enhance depth data. A wide field of view (91.2°×65.5°× 100.6°) contributes to accurate depth perception when harvesting apparatus 10 is in motion. As described in detail below, computer software takes image information acquired by camera 58 and determines the exact distance of cutting disks 64 from the broccoli crown. Camera 58 detects the unique texture of the broccoli plant, and the computer software performs image processing 102 to position carriage frame 62 relative to the broccoli crown in three-dimensional space so that a motion server 104 causes rack and pinion mechanism 60 to precisely position cutting disks 64 at a specified height along the broccoli stalk to slice it.

Image processing 102 is performed and motion server 104 operates preferably on an NVIDIA Jetson TX2 module 106, which is a high speed embedded artificial intelligence (AI) computing device that is useful for deploying computer vision and deep learning. The Jetson TX2 contains all active processing components, including image signal processors, a graphics processing unit (GPU), and a Mobile Industry Processor Interface (MIPI) Camera Serial Interface (CSI) ingest.

Motion server 104, in response to the broccoli plant height measurement signal, provides a height-adjusting motor control signal 108 to a motor controller 110, which produces the cutting height signal that drives height-adjusting motor 78 to set the height of cutting disks 64 by operation of rack and pinion mechanism 60. Motion server 104 also provides a steering angle motor control signal 112 to a motor controller 114, which drives each of steering motors 40 to position the turning angle of wheels 32 at front end 44. Motor controllers 110 and 114 are each preferably an Arduino UND microcontroller running on PID (Position/Integration/Derivative) control code. A high-power motor driver module, such as a Hiletgo BTS7960 43A, amplifies the output of the Arduino UNO microcontroller and provides the amplified output signal to drive motor 40.

Figure 4:
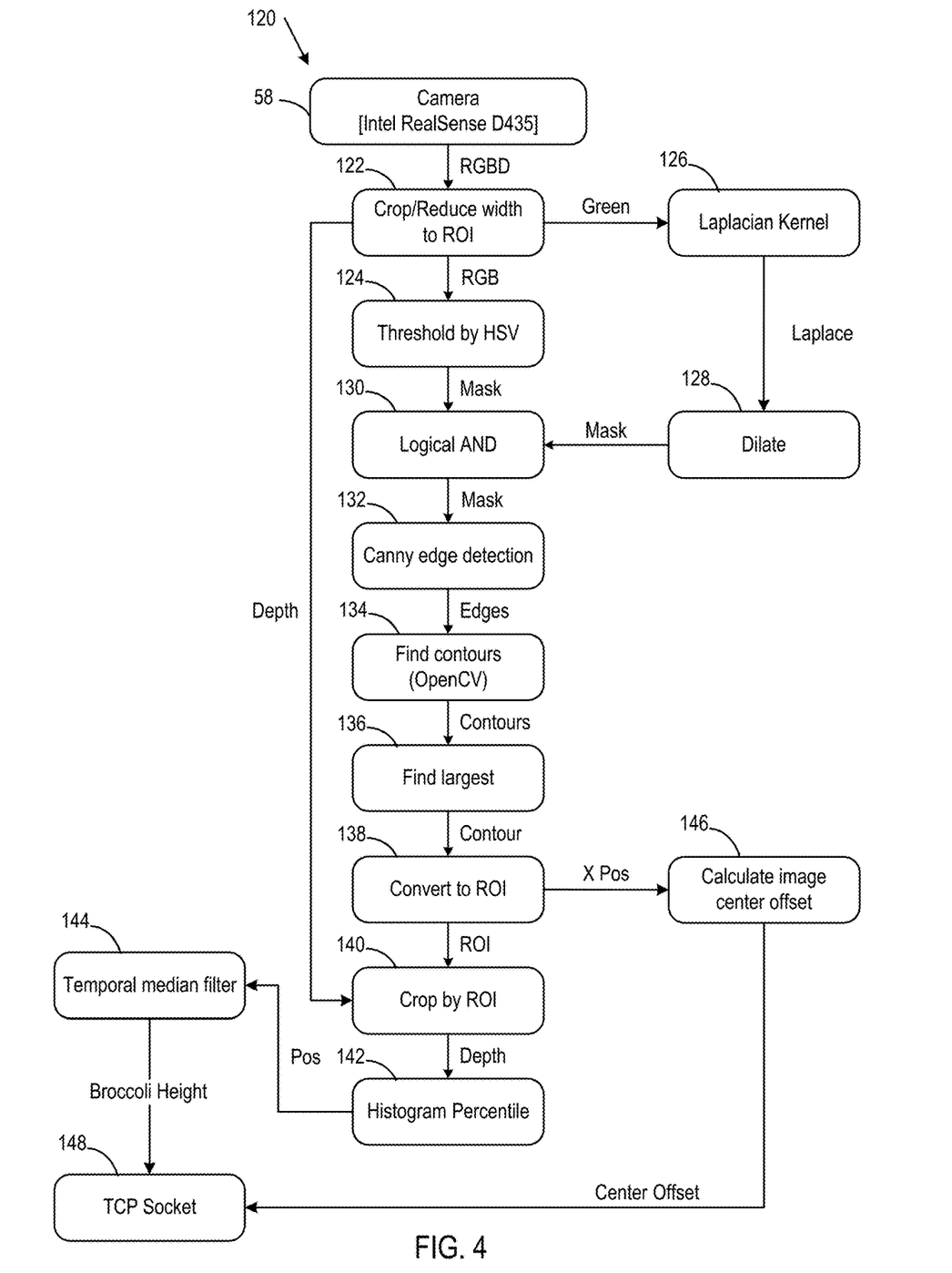
FIG. 4 is a flow diagram of the steps performed to process image information acquired by a camera used in the harvesting apparatus embodiment of FIG. 1 to produce a height-adjusting motor control signal and a steering angle motor control signal.

FIG. 4 is a flow diagram 120 of the steps performed to process image information acquired by camera 58 to produce height-adjusting motor control signal 108 and steering angle motor control signal 112. The production of motor control signals 108 and 112 is accomplished by image processing 102 implemented in a software program operating on Jetson TX2 module 106.

With reference to FIG. 4, as harvesting apparatus 10 traverses a swath of broccoli plants straddled between lower tubes 22, image camera 58 produces Red, Green, and Blue color data and Depth data (RGBD data) representing each image in a sequence of images of the broccoli plants within the FOV of camera 58.

A process block 122 indicates cropping to remove unwanted outer areas and reducing the width of the image acquired by camera 58 to form a region of interest (ROI) for analysis. Process block 102 shows three data flow paths for different subsets of the RGBD data to remove image background color.

A first data flow path relates to processing RGB color data. A process block 124 represents color-based pixel separation in hue, saturation, value (HSV) color space by threshold analysis of the Red, Green, Blue color data. The HSV color space is used to isolate features that are Green in Hue for the purpose of eliminating background, including dirt. A masking process performs nondestructive editing of the resulting RGB data to remove image background color.

A second data flow path relates to processing Green color data. A process block 126 indicates a Laplacian Kernel receiving the Green color data, which represent the dominant color of the broccoli plants. Laplacian Kernel 126 is used to perform computationally fast detection of edges in the image of the broccoli plants as represented by the Green color data. The detected edges reveal the texture of the broccoli crown and outline of the broccoli plant. The edge-detected image produced at the Laplacian Kernel output undergoes morphological image processing dilation, as indicated by process block 128. The dilation adds pixels to enlarge the edge-detected image represented by the Green color data. A masking process performs nondestructive editing of the dilated image to sharpen the edge detail by removal of background color.

A logical AND block 130 represents pixel-by-pixel comparison of image data values to determine the conjunction of logical images of the image data produced by the operations on different subsets of the RGB data, as represented by process blocks 124 and 128. The image data resulting from logical conjunction undergo Canny edge detection represented by process block 132. Canny edge detection suppresses noise, to which Laplacian Kernel process 126 is susceptible, and applies hysteresis and connectivity analysis to detect an edge near the true edge. The edges developed by Canny edge detection are applied to an open source computer vision library (OpenCV) 134 to perform shape analysis of the edges to find broccoli plant contours. Process block 136 represents finding the largest contour from the broccoli plant contours found by the shape analysis. The largest contour represents an outline of the crown of the broccoli plant.

Process block 138 represents converting the largest contour to a region of interest (ROI) for two purposes. The first purpose uses Depth data delivered by way of a third data flow path from process block 122 and is represented by process block 140. The first purpose is to apply the saved full Depth image data extracted by the image cropping and image width reduction at process block 122 and cropped ROI image data of process block 138 to get for each image pixel a distance value measured with reference to the Depth image data coordinate system. Process block 142 represents organizing the Depth image pixel values in a histogram to define the distribution of the pixel intensities to obtain position data from the cropped ROI Depth image. The algorithm takes a percentile of the histogram values, which is settable to, for example, the 85% percentile of low values. The low values represent those that are closer to camera 58, and taking the predominant ones of the low values represents an attempt to find the broccoli crown peak. Process block 144 represents removal of blurring from the sequence of image data by operation of a temporal median filter. The temporal median filtered Depth image provides a broccoli plant height measurement signal, which represents a set distance (e.g., 8 in. (200 mm)) from the broccoli crown peak and is applied to a transmission control protocol (TCP) Socket 148.

The second purpose, which is represented by process block 146, removes unwanted outer areas of the largest broccoli plant contour to calculate an image center offset, which is the distance from the center of the camera lens to the bottom or the top of the image. The image center offset signal developed at process block 146 is also applied to TCP Socket 148. The broccoli plant height measurement and image center offset signals are delivered to a TCP Socket server 150, which resides in Jetson TX2 module 106, as described with reference to FIG. 5.

Figure 5:
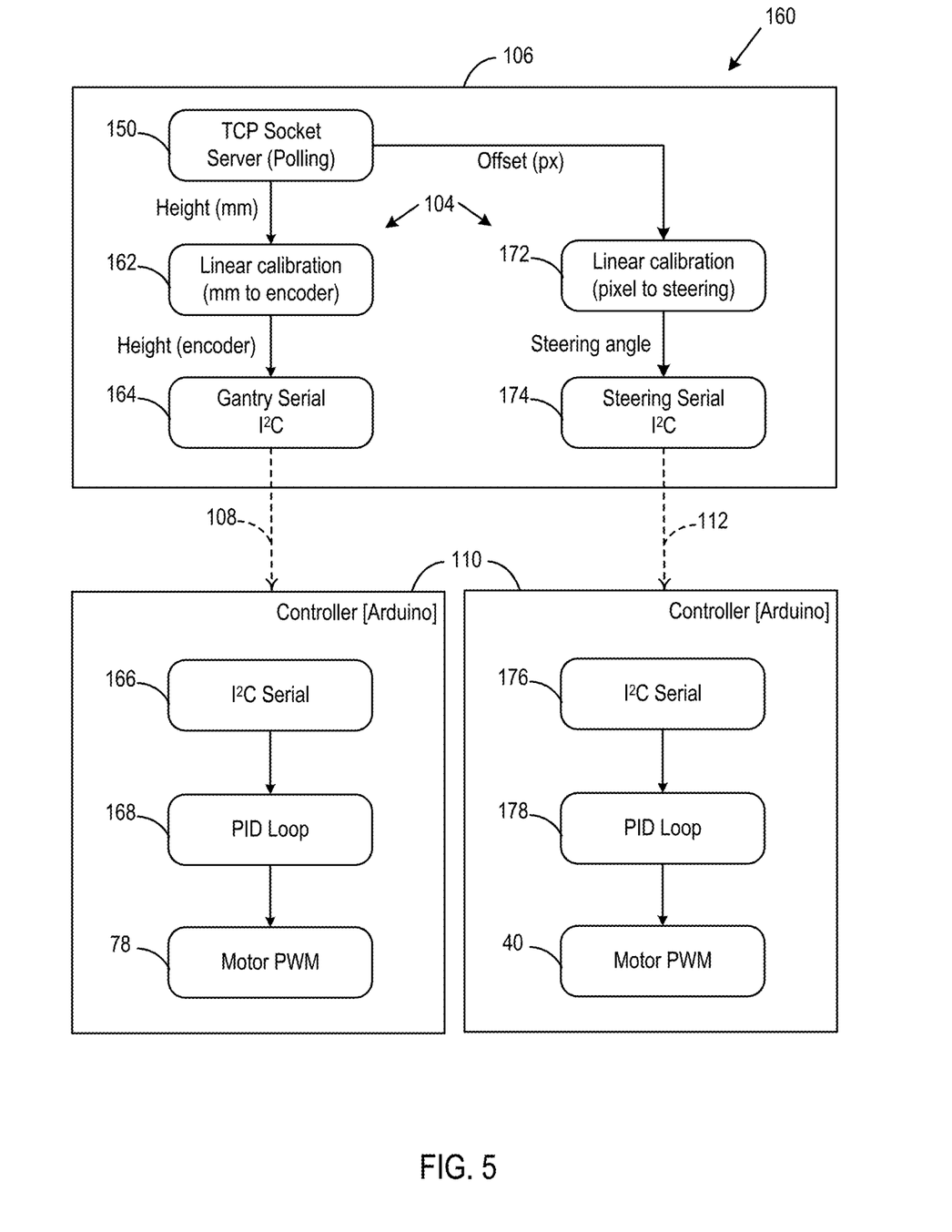
FIG. 5 is a flow diagram of the application of broccoli height and image center offset information to a transmission control protocol (TCP) Socket server to provide the height-adjusting motor control signal and the steering angle motor control signal for use by the harvesting apparatus embodiment of FIG. 1 to cut broccoli plants.

FIG. 5 is a flow diagram 160 of the application of the broccoli plant height measurement and image center offset signals to TCP Socket server 150 to produce height-adjusting motor control signal 108 and steering angle motor control signal 112.

With respect to height-adjusting motor control signal 108, TCP Socket server 150 receives the broccoli plant height measurement signal and delivers to a linear calibration module 162 broccoli height data expressed in millimeters for conversion to a distance to be traveled by pinion shaft 76 of height-adjusting motor 78. Height-adjusting motor control signal 108 encoded to set the motor shaft travel distance and thereby represent the broccoli height values is delivered through a Gantry Serial I$^2$C interface 164 to an I$^2$C Serial interface 166 in motor controller 110. Motor controller 110 conditions height-adjusting motor control signal 108 by producing a pulse width modulated (PWM) signal with PID loop control 168. DC motor 78 rotates pinion shaft 76 to a specified position in response to the PWM signal, and PID control loop 168 adjusts motor movement backwards and forwards to achieve and hold the specified position. This forms a cutting height signal, which is delivered to height-adjusting motor 78 operating with rack and pinion mechanism 60. Rack 68 positions cutting disks 64 at the specified height to sever the broccoli plant.

With respect to steering angle motor control signal 112, TCP Socket server 150 receives the image center offset signal and delivers to a linear calibration module 172 image center offset data expressed in pixel units for conversion to a distance to be traveled by the shaft of steering motor 40. Steering angle motor control signal 112 encoded to set the motor shaft travel distance and thereby represent steering angle values is delivered through a Steering Serial I$^2$C interface 174 to an I$^2$C Serial interface 176 in motor controller 110. Motor controller 110 conditions steering angle motor control signal 112 by producing a pulse width modulated signal with PID loop control 178. DC motor 40 rotates its shaft to a specified position in response to the PWM signal, and PID control loop 178 adjusts motor movement backwards and forwards to achieve and hold the specified position. This forms a steering angle signal, which is delivered to each steering motor 40 that is operatively connected to its associated wheel 32 at front end 44 of frame 12.

Several factors contribute to value of harvested broccoli plants. These factors include timing of the harvesting of broccoli plants and color variation, size, and precise height of a harvested broccoli plant. The timing of plant field harvesting can materially impact broccoli plant value. Several days' premature or delayed harvesting can result in an approximately 30% diminution in crop value. Color variation is indicative of crop maturity or disease discoloration. Harvested broccoli plants 12 in. (30.5 cm)-26 in. (66.0 cm) in height are typically commercially acceptable, but long stalks diminish broccoli plant value.

The texture of a broccoli crown as shown on an image produced by camera 58 and detected as described with reference to process blocks 126 and 128 of FIG. 4 can be used to assess the tightness of the broccoli head. Images presenting tight, intermediate, and loose coarseness of the broccoli crown indicate, respectively, premature, timely, and delayed harvesting of broccoli plants. The size of the broccoli crown shown on the image can be used to reject smaller broccoli crowns. Process block 140 of FIG. 4 represents, as the ROI, the largest contour of a broccoli plant, which is effectively the size of the broccoli crown. As explained above with reference to FIG. 4, the ROI size correlation to broccoli crown size is also based on the depth dimension in that a broccoli crown that is closer to camera 58 will look bigger in the image. Combining ROI size and distance from camera 58, i.e., depth, provides the size of the crown of the broccoli plant, which can be rejected if the broccoli crown is below a specified size cutoff. Camera 58 provides color information that is shown on the image, and the colors can be analyzed within the ROI to detect in the broccoli crown an insufficient amount of green color that would indicate a diseased or otherwise not suitable for harvest broccoli plant.

Detection of one or more of the texture, size, and color of a broccoli crown enables selective harvesting, in which immature, diseased, or otherwise unsuitable for harvest broccoli plants may be bypassed and left behind uncut. A preferred way to bypass a broccoli plant, in response to detection of tight coarseness, undersize, or disease discoloration of a broccoli crown, is to produce by electronic circuitry 59 a stalk cut interrupt signal that can be used to move cutting disks 64 away from the stalk of an unsuitable for harvest broccoli plant.

A first implementation of selective harvesting entails opening gap 66 to separate cutting disks 64 from each other along the Y-axis. This is accomplished by attaching cutting disk mounting plates 65 to horizontal linear guides 200 forming part of carriage frame 62. A linear motor 202 affixed to carriage frame 62 and receiving the stalk cut interrupt signal moves cutting disk mounting plates 65 in opposite directions along horizontal linear guides 200 to move cutting disks 64 away from the unsuitable for harvest broccoli plant in the travel path of frame 12. An alternative to use of linear motor 202 to separate cutting disks 64 includes use of a rotary motor with appropriate coupling components or a pneumatic cylinder operatively connected to a compressed gas supply.

A second implementation of selective harvesting entails raising carriage frame 62 above the unsuitable for harvest broccoli plant before cutting disks 64 encounter it. The stalk cut interrupt signal causes height-adjusting motor 78 to move carriage frame 62 along the Z-axis to a height sufficient to clear the broccoli crown of the broccoli plant. This second implementation is the lesser preferred alternative because of the need to raise the large mass of carriage frame 62 and the components attached to it, as well as the amount of time required to raise cutting disks 64 and the consequent necessary slowing of the forward movement of frame 12.

It will be obvious to those having skill in the art that many changes may be made to the details of the above-described embodiments without departing from the underlying principles of the invention. The scope of the present invention should, therefore, be determined only with reference to the following claims.

The invention claimed is:

1. Robotic automated broccoli plant harvesting apparatus, comprising:

a mobile frame configured to traverse, in response to a motive force, a swath of multiple standing broccoli plants in a large-area planting of broccoli, each of the multiple broccoli plants formed of a crown and a stalk;

a vision system operatively connected to the frame to provide a sequence of images representing the multiple broccoli plants encountered by the frame as it traverses the swath of multiple broccoli plants, the vision system including a source of light and a camera providing color, texture, and distance information characterizing the multiple broccoli plants within a field of view of the camera;

a processor operational to perform image signal processing that combines the color, texture, and distance information to identify height and position data for each of the multiple broccoli plants;

a height-adjustable cutting mechanism operatively connected to the frame; and electronic circuitry responsive to the height and position data to provide a height adjusting control signal that causes the height-adjustable cutting mechanism to sever the stalk of each of the multiple broccoli plants at a specified distance below the crown of the broccoli plant.

2. The harvesting apparatus of claim 1, in which the camera includes RGB and depth sensors.

3. The harvesting apparatus of claim 1, in which the height-adjustable cutting mechanism includes two opposed rotary cutting blades.

4. The harvesting apparatus of claim 1, in which the height-adjusting control signal causes severing the stalks of the multiple broccoli plants to substantially the same length.

5. The harvesting apparatus of claim 1, in which the processor produces a cut interrupt signal in response to a determination that any one of the multiple broccoli plants is not suitable for harvesting, in which the height-adjustable cutting mechanism includes first and second opposed cutting blades, and further comprising first and second guides to which the respective first and second opposed cutting blades are operatively connected and which, in response to the cut interrupt signal, receive motive force that imparts sufficient separation between the first and second opposed cutting blades to allow the corresponding broccoli plant to pass unsevered by them and thereby implement selective harvesting as the mobile frame traverses the swath of multiple standing broccoli plants.

6. The harvesting apparatus of claim 5, in which the first and second opposed cutting blades include respective first and second opposed rotary cutting blades.

7. The harvesting apparatus of claim 5, in which the corresponding broccoli plant is not suitable for harvesting because of tight or loose broccoli crown coarseness.

8. The harvesting apparatus of claim 5, in which the corresponding broccoli plant is not suitable for harvesting because of an undersized broccoli crown.

9. The harvesting apparatus of claim 5, in which the corresponding broccoli plant is not suitable for harvesting because of broccoli crown discoloration.

10. The harvesting apparatus of claim 1, in which:

the frame includes a wheel steering assembly to guide a path of travel of the frame along the swath of multiple broccoli plants;

the processor detects the crowns of broccoli plants in the swath of multiple broccoli plants; and as the frame moves along the path of travel, the processor detects and keeps track of centers of the detected broccoli crowns and causes production of a steering control signal to which the wheel steering assembly responds by steering the frame generally toward an average of centers of the detected broccoli crowns.

11. The harvesting apparatus of claim 10, in which the swath of multiple broccoli plants includes crowns of broccoli plants arranged in a generally straight row.

12. The harvesting apparatus of claim 10, in which the swath of multiple broccoli plants includes crowns of broccoli plants arranged in an alternating lateral offset pattern.

\* \* \* \* \*